United States Patent [19]
Santini et al.

[11] Patent Number: 5,389,717
[45] Date of Patent: Feb. 14, 1995

[54] ERASABLE MARKING COMPOSITION

[75] Inventors: Andree Santini, Easton; Richard E. Miller, Nazareth, both of Pa.

[73] Assignee: Binney & Smith Inc., Easton, Pa.

[21] Appl. No.: 203,655

[22] Filed: Feb. 28, 1994

Related U.S. Application Data

[63] Continuation of Ser. No. 855,255, Mar. 23, 1992, abandoned.

[51] Int. Cl.⁶ .................. C09D 11/10; C09D 13/00; C08L 53/02
[52] U.S. Cl. .................. 524/575; 523/160; 523/161; 523/164
[58] Field of Search .............. 524/575; 523/160, 161, 523/164

[56] References Cited

U.S. PATENT DOCUMENTS

| | | | |
|---|---|---|---|
| 3,923,718 | 12/1975 | Arpin | 524/575 |
| 3,997,498 | 12/1976 | Reese et al. | 523/161 |
| 4,297,260 | 10/1981 | Ferree, Jr. et al. | 523/161 |
| 4,389,499 | 6/1983 | Riesgraf | 523/161 |
| 4,390,646 | 6/1983 | Ferguson | 523/161 |
| 4,391,927 | 6/1983 | Farmer, III | 523/161 |
| 4,407,985 | 10/1983 | Muller | 523/161 |
| 4,410,643 | 10/1983 | Muller | 523/161 |
| 4,596,846 | 6/1986 | Bohne et al. | 524/242 |
| 4,606,769 | 8/1986 | Tanaka et al. | 523/161 |
| 4,665,107 | 5/1987 | Micale | 523/161 |
| 4,687,791 | 8/1987 | Miyajima et al. | 523/161 |
| 4,721,739 | 1/1988 | Brenneman et al. | 523/161 |
| 4,738,725 | 4/1988 | Daugherty et al. | 523/161 |
| 4,760,104 | 7/1988 | Miyajima et al. | 523/161 |
| 4,877,566 | 10/1989 | Cha | 524/575 |
| 4,889,877 | 12/1989 | Seitz | 523/161 |
| 4,900,617 | 2/1990 | Smith | 524/575 |
| 4,940,628 | 7/1990 | Lin et al. | 523/161 |
| 4,940,739 | 7/1990 | Seitz | 523/161 |
| 5,120,359 | 6/1992 | Uzukawa | 524/575 |
| 5,120,765 | 6/1992 | Southwick | 524/575 |

*Primary Examiner*—Paul R. Michl
*Assistant Examiner*—Olga Asinovsky
*Attorney, Agent, or Firm*—Leydig, Voit & Mayer, Ltd.

[57] ABSTRACT

An erasable marking composition comprising a noncarboxylated styrene-butadiene copolymer resin, a colorant, and a solvent. The composition can be applied to substrates by a variety of delivery means, such as porous-tipped and brush-tipped writing instruments, as well as brushes, and can be easily erased with a substantially nonabrasive eraser, such as a common pencil eraser, for an extended period of time.

23 Claims, No Drawings

ERASABLE MARKING COMPOSITION

This is a continuation of copending application Ser. No. 07/855,255, filed on Mar. 23, 1992, now abandoned.

TECHNICAL FIELD OF THE INVENTION

The present invention relates to erasable marking compositions. More particularly, this invention relates to erasable marking compositions that can be dispensed through a porous-tipped writing instrument or applied through other suitable delivery means such as brush-tipped writing instruments, brushes, and the like, and can be easily erased with a substantially non-abrasive eraser, such as a common pencil eraser, for an extended length of time.

BACKGROUND OF THE INVENTION

Many erasable inks have been developed over the years. Such inks are usually only suitable for use in ballpoint pens with pressurized ink reservoirs. Characteristics that are beneficial for such use are not practically extendable to writing instruments that have porous tips for ink distribution.

In addition, many of these inks are only initially erasable, becoming essentially permanent within a short period of time. Furthermore, some of these inks can only be used on nonporous writing substrates.

U.S. Pat. No. 4,297,260 discloses an erasable writing medium composition suitable for use in porous-tipped and ballpoint pens. The medium comprises a carboxylated styrene-butadiene latex emulsion and a basic dye. The medium may additionally contain an anti-drying agent and a plasticizer.

U.S. Pat. No. 4,407,985 discloses an ink of 1.5 million cps viscosity suitable for use in ballpoint pens. The ink comprises a pigment, a polar elastomer, and a solvent system comprising a volatile component and an essentially non-volatile component including a pigment vehicle and a low viscosity plasticizer. The polar elastomer may be butadiene/acrylonitrile copolymer rubbers, vinyl acetate/ethylene copolymer rubbers or mixtures thereof. The ink is said to be characterized by an initial erasability with ordinary pencil erasers and by a capability of developingpermanence over a period of time.

U.S. Pat. No. 4,410,643 discloses an ink composition that comprises a pre-pigmented elastomer and a solvent system that contains volatile and nonvolatile components. The ink purportedly has the same erasability characteristics as that of the aforementioned '985 patent and is suitable for use in ballpoint pens.

U.S. Pat. Nos. 4,389,499, 4,390,646 and 4,391,927 pertain to an erasable ink that comprises a pigmented organic solvent solution containing a mixture of thermoplastic block copolymers, such as styrene, ester, or urethane in combination with butadiene, isoprene, or ethylene-butylene. Polybutylene and poly-alpha-methylstyrene are added to decrease smearing. The erasable ink is said to require little or no pressurization and to be suitable for use in ballpoint pens.

U.S. Pat. No. 4,606,769 discloses an erasable ink composition that comprises rubber, a low-boiling aliphatic or aromatic hydrocarbon rubber solvent, a black pigment and a quality adjuster. The composition may additionally contain a surfactant lubricant.

U.S. Pat. Nos. 4,687,791 and 4,760,104 disclose an erasable ballpoint pen ink that comprises a cis-1,4-polyisoprene synthetic rubber or a styrene-butadiene copolymer, volatile and nonvolatile solvents, and a pigment. The composition may additionally comprise fine powders of silicon dioxide.

U.S. Pat. No. 4,721,739 pertains to an erasable ink composition that comprises a styrene-based thermoplastic elastomer block copolymer, a plasticizer, a solvent, a colorant, a resin, a lubricant, and an alkylated polyvinyl pyrrolidone or nonionic surfactant-dispersant.

U.S. Pat. No. 4,738,725 pertains to an initially erasable ink for use in a pressurized ball point pen. The ink comprises an elastomeric polymer, volatile and nonvolatile solvents, and pigment. The elastomeric polymer is selected from thermoplastic and rubbery blocks in which the thermoplastic blocks are selected from the class consisting of styrene and urethane, while the rubbery blocks are selected from butadiene, isoprene, and ethylenebutylene blocks, polyisobutylene polymers, copolymers of ethylene and propylene, and terpolymers of ethylene, propylene, and an unconjugated diene.

U.S. Pat. Nos. 4,889,877 and 4,940,739 pertain to a high-solids content, aqueous, microcapsule-containing printing ink, which comprises an aqueous solution containing water, a nonvolatile diluent, and oil-containing microcapsules dispersed in the aqueous solution. The ink also includes a protective colloid blend of materials selected from styrene-maleic anhydride copolymers, methyl vinyl ether-maleic anhydride copolymers, styrene-maleic ester copolymers, methyl vinyl ether-maleic ester copolymers, carboxymethyl cellulose, casein, polyvinyl alcohol, polyvinyl pyrrolidone, acrylic resins, and styrenated acrylic resins, and may further contain a latex binder emulsion or an alkali-soluble resin.

U.S. Pat. No. 4,940,628 discloses an erasable system including a marking element and an erasable marking composition. The erasable marking composition consists essentially of an aqueous dispersion of a particulate, polymeric film-forming material, a colorant, and a polymeric shear-thinning material.

While the prior art discloses a variety of erasable marking compositions, there remains a need for an erasable marking composition that can be utilized in porous-tipped writing instruments, such as felt tipped markers, as well as with other delivery means, and which can be easily erased with a substantially non-abrasive eraser, such as a common pencil eraser, for an extended period of time.

BRIEF SUMMARY OF THE INVENTION

It is an object of the present invention to provide erasable marking compositions that are suitable for use in porous-tipped writing instruments, such as felt tipped markers, as well as with other delivery means.

It is another object of the present invention to provide erasable marking compositions that can be easily erased for an extended period of time.

It is yet another object of the present invention to provide erasable marking compositions that can be erased with conventional rubber or plastic erasers.

It is a further object of the present invention to provide erasable marking compositions that are suitable for use on porous and nonporous writing surfaces or substrates.

These and other objects and advantages of this invention, as well as additional inventive features, will become apparent from the description of the present invention provided herein.

The present invention pertains to an erasable marking composition that comprises a noncarboxylated styrene-butadiene copolymer resin, a colorant, and a solvent. Suitable colorants include pigments and fluorescent pigments. The composition may additionally contain humectants and preservatives. Thickeners, both water-soluble and associative, coalescing agents, release agents, surfactants, and the like may also be added to the composition.

The compositions are suitable for use in porous-tipped writing instruments, such as felt tipped markers; however, the compositions are not limited to such markers and may be used in ballpoint and fountain pens. The compositions may even be used as paints for application with brushes, rollers, air brushes, and the like.

The marking compositions may be applied to porous and nonporous writing surfaces or substrates. The compositions may be easily erased with conventional rubber or plastic erasers and maintain a high degree of erasability for an extended period of time.

DETAILED DESCRIPTION OF THE PREFERRED EMBODIMENTS

The erasable marking composition of the present invention comprises a noncarboxylated styrene-butadiene copolymer resin, a colorant, and a solvent.

The noncarboxylated styrene-butadiene copolymer resin (SBR) preferably has a styrene:butadiene ratio of about 25:75 to about 55:45. The noncarboxylated styrene-butadiene copolymer resin is preferably added to the erasable marking composition as an emulsion, preferably having a low viscosity, high surface tension, and high solids content. The viscosity of the SBR emulsion is preferably 600 cps or less, more preferably 150 cps or less, and most preferably 50 cps or less. The SBR emulsion surface tension is preferably greater than 50 dynes/cm, more preferably 55 dynes/cm or higher, and most preferably about 55-60 dynes/cm. The viscosity and surface tension of the SBR emulsion, in and of itself, is not as important as the overall viscosity and surface tension of the erasable marking composition which contains the SBR emulsion.

The SBR may be present in the erasable marking composition in any suitable amount. Since the SBR will typically be added to the erasable marking composition as an emulsion containing other substances, e.g., an aqueous emulsion, the quantity of SBR added to the present inventive erasable marking composition will depend on the quantity of SBR composition utilized as well as the actual percent of SBR, e.g., percent solids, in the SBR composition. For example, as regards SBR emulsions of up to 40% solids or more, the erasable marking composition of the present invention may contain up to 100% by weight SBR emulsion of the total erasable marking composition, i.e., up to about 40% or more by weight SBR solids of the total erasable marking composition. The quantity of SBR solids will typically be about 4-40% by weight of the total erasable marking composition, more usually about 16-28% by weight of the total erasable marking composition, and commonly about 20-25% by weight of the total erasable marking composition. Generally, the use of a higher resin solids in the marking composition results in improved erasability but adversely affects the flow characteristics of the marking composition. Accordingly, the ideal SBR emulsion for use in the present inventive erasable marking composition would be of very high solids and very low viscosity to provide for an erasable marking composition of high solids and an acceptably low viscosity.

Suitable SBR emulsions include Darex® 643L (W. R. Grace & Co.) and Pliolite® 2108, LVP-5622, and LPF-5356 (Goodyear Tire & Rubber Co.). Pliolite® 2108 is preferred as the SBR emulsion for use in the present inventive erasable marking compositions. Pliolite® 2108 contains 38-41% solids and has a viscosity of about 30 cps and a surface tension of about 55-60 dynes/cm.

The colorant will typically be a pigment. The pigment used in the present inventive erasable marking composition is preferably one that is insoluble in the erasable marking composition and possesses a uniform particle size. The particle size of the colorant depends on the use of the erasable marking composition, in particular the means by which the erasable marking composition will be applied to substrates. Preferred delivery means of the erasable marking composition are porous or fibrous tipped pens and markers. With such a delivery means, a colorant of small particle size is necessary so that the colorant can pass through the delivery means and be deposited on the desired substrate. The colorant preferably has a mean particle size of less than 500 nm, most preferably in the range of about 50-150 nm, in an erasable marking composition to be used with porous felt-tip pens and markers. In this regard, the Hostafine® line of pigments commercially available from Hoechst AG are very suitable for use in the erasable marking composition. The Hostafine® pigments have a mean particle size in the range of 50-150 nm, with about 95% of the pigment particles being less than 500 nm. The Sunsperse® line of pigments commercially available from Sun Chemical are also suitable for use in the erasable marking composition, and suitable fluorescent pigments include the WD line of fluorescent pigments commercially available from Radiant.

For delivery means such as brush-tipped markers and brushes, the particle size of the colorant of the present inventive erasable marking composition may be larger. For example, paints may be prepared from the erasable marking composition of the present invention. In situations wherein the colorant particle size is not limited by the delivery means, a larger colorant particle size, consistent with other considerations, may be preferred inasmuch as the larger particle size would aid in the erasability of the marking composition.

Dyes, e.g., basic dyes, generally do not function as well as pigments as the colorant in the present inventive erasable marking composition but may be used as the exclusive colorant or in addition to pigments in the erasable marking composition. Suitable dyes include Basic Red 14 and Intratherm Bright Blue.

The colorant may be present in the erasable marking compositions in any suitable amount. Since the colorant will typically be added to the erasable marking composition in the form of a composition containing other substances, e.g., aqueous pigment dispersions containing propylene glycol as sold by Hoechst AG under the Hostafine® label, the quantity of colorant added to the present inventive erasable marking composition will depend on the quantity of colorant composition utilized as well as the actual percent of colorant, e.g., percent solids, in the colorant composition. For example, as regards pigment dispersions of up to 40% solids, the erasable marking composition of the present invention will typically contain up to 40% by weight pigment dispersion of the total erasable marking composition, i.e., up to about 16% by weight pigment solids of the total erasable marking composition. The quantity of pigment solids is preferably about 0.4–4% by weight of the total erasable marking composition, more preferably about 0.4–3% by weight of the total erasable marking composition, and most preferably about 1–2% by weight of the total erasable marking composition.

The solvent of the present inventive erasable marking composition is preferably water, which may be present in an amount up to 96% or more by weight of the total erasable marking composition. While other suitable solvents may be used, the solvent must not adversely affect the other components nor lower the surface tension of the overall composition to an unsatisfactory level. The overall content of solvent in the erasable marking composition will include the directly added solvent in addition to the solvent, e.g., water, present in the SBR emulsion and colorant composition used to prepare the erasable marking composition. The erasable marking composition preferably contains up to 96% by weight total water of the total erasable marking composition, more preferably up to about 80% by weight total water of the total erasable marking composition, and most preferably about 60–78% by weight total water of the total erasable marking composition.

The components of the present inventive marking composition may be combined in any suitable manner. The colorant will typically be initially added to the solvent, followed by addition of the noncarboxylated styrene-butadiene latex copolymer resin. Alternatively, the noncarboxylated styrene-butadiene latex copolymer resin may be added to a portion of the solvent, followed by addition of the colorant and remainder of the solvent.

The erasable marking composition of the present invention preferably has a surface tension of at least 50 dynes/cm, more preferably about 50 dynes/cm to about 55 dynes/cm. The viscosity of the erasable marking composition must be suitable for the desired or intended delivery means. Generally, the erasable marking composition will have a viscosity of about 1.5 cps to about 6.0 cps for uses with porous-tipped writing instruments and a viscosity of up to 2000–3000 cps or higher for uses such as in brush-on paints.

The erasable marking composition may further comprise a humectant, such as glycerine, glycols such as propylene glycol and diethylene glycol, and mixtures thereof. The humectant may be present in any suitable amount, preferably up to 30% by weight of the total erasable marking composition, and most preferably 5–20% by weight of the total erasable marking composition.

The erasable marking composition also may include suitable preservatives, such as Kathon® PFM, available from Rohm and Haas, which is a biocide containing 5-chloro-2-methyl-4-isothiazolin-3-one, 2-methyl-4-isothiazolin-3-one, magnesium chloride and nitrate, cupric nitrate, and water. The preservative may be present in any suitable amount, preferably up to 0.5% by weight of the total erasable marking composition, more preferably up to 0.15% by weight of the total erasable marking composition.

The present inventive erasable marking composition may include other additives such as coalescing agents, water-soluble or associative thickeners, release agents, surfactants which are preferably noncarboxylated, and the like.

The compositions are suitable for use in porous-tipped writing instruments, such as felt tipped markers; however, the compositions are not limited to such markers and may be used in ballpoint and fountain pens. The compositions may even be used as paints for application with brushes, rollers, air brushes, and the like.

The marking compositions may be applied to a variety of porous and nonporous writing surfaces or substrates. The compositions may be easily erased with conventional rubber or plastic erasers and will maintain a high degree of erasability for an extended period of time, e.g., from two weeks to up to at least six months, primarily depending on the type of substrate.

The following examples serve to further illustrate the present invention but are not intended to limit the scope of the invention.

EXAMPLE 1

Preferred embodiments of the erasable marking composition may be prepared as follows:

| Component | Preferred Range | Optimal Range |
| --- | --- | --- |
| Pliolite ® 2108 (SBR solids) | 4–40% | 16–28% |
| Hostafine ® (pigment solids) | Up to 16% | 0.4–4% |
| Glycerine (humectant) | 0–30% | 5–20% |
| Kathon ® PFM (preservative) | 0–0.15% | 0.15% |
| H₂O (Solvent) | Up to 96% | Up to 78% |

EXAMPLE 2

An erasable marking composition was prepared containing 55.00 wt. % Goodyear Pliolite® 2108 SBR emulsion, 3.00 wt. % Hostafine® B2G pigment dispersion, 41.85 wt. % water, and 0.15 wt. % Kathon® PFM preservative. The erasable marking composition was applied to various paper substrates and found to be easily erasable with an ordinary pencil eraser. The composition was found to be about as easily erasable with an ordinary pencil eraser a day after the composition was applied to various paper substrates.

EXAMPLE 3

An erasable marking composition was prepared containing 55.00 wt. % Goodyear Pliolite® 2108 SBR emulsion, 2.00 wt. % Radiant Pink WD PK-1607 fluorescent pigment, 42.85 wt. % water, and 0.15 wt. % Kathon® PFM preservative. The erasable marking composition was applied to a porous paper substrate and found to be erasable with an ordinary pencil eraser.

EXAMPLE 4

An erasable marking composition was prepared containing 55.00 wt. % Goodyear Pliolite® 2108 SBR emulsion, 3.00 wt. % 1% Basic Red Dye 14 (Dupont Sevron® Brilliant Red 4G Conc.), 41.85 wt. % water, and 0.15 wt. % Kathon® PFM preservative. The erasable marking composition was applied to a porous paper substrate and found to be erasable with an ordinary pencil eraser, although not quite as easily erasable as the composition using a pigment as the colorant. The applied erasable marking composition exhibited insufficient color depth, and when an attempt was made to increase the color depth, the erasable marking composition gelled.

EXAMPLE 5

Marking compositions were prepared with different SBR emulsions in accordance with the present invention. The SBR emulsions and their characteristics are identified below. The marking compositions were prepared using the indicated SBR emulsion in an amount to yield the indicated wt. % SBR solids amount based on the total marking composition, Hostafine ® Blue B2G pigment dispersion (about 40% solids) in an amount to yield the indicated wt. % pigment solids amount based on the total marking composition, 0–0.15 wt. % Kathon ® PFM preservative, and the remainder water. The thus prepared marking compositions were then applied to a porous paper substrate. After allowing the compositions to dry, attempts were made to erase the composition using an ordinary pencil eraser, and the ease and completeness of the erasure was evaluated on a scale of 0–5, with a rating of 0 designating that substantially no erasure of the composition was possible and a rating of 5 designating that complete erasure of the composition was easily accomplished.

Broadline and fineline markers were filled using the thus prepared compositions, and sets of either three broadline or three fineline markers (one each of the blue, red, and green colors) was provided to twenty-seven girls aged 8–11 in an experimental test to evaluate the ease and degree of erasability of the marking compositions on ordinary notebook paper.

After using the experimental markers, the girls were interviewed about the markers containing the erasable marking composition and asked to rate the markers on a scale of 0–10 (with 10 being the highest rating) with regard to the ease and degree of erasability.

In a separate experimental evaluation, the same girls were shown how images made with the markers erased on four different types of paper (i.e., heavy weight paper, looseleaf paper, construction paper, and coloring book paper) and asked to rate the erasability of the marking composition using the same rating scale of 0–10 (with 10 being the highest rating).

The results of the testing were as follows:

| | | SBR Emulsion | | | | | Marking Composition | | | |
|---|---|---|---|---|---|---|---|---|---|---|
| Example | Name | % Solids | Viscosity (cps) | Surface Tension (dynes/cm) | Styrene/ Butadiene Ratio | Carboxylated (yes/no) | % SBR Solids | % Pigment Solids | Surface Tension (dynes/cm) | Erasability Rating (0–5) (worst-best) |
| 5A | Unocal 9410 | 50.0 | 500 | — | 25/75 | yes | 27.5 | 1.2 | — | 2 |
| 5B | Unocal 9412 | 50.0 | 600 | — | 20/80 | yes | 27.5 | 1.2 | 51.2 | 3 |
| 5C | Unocal 4125 | 50.0 | 300 | 50 | 45/55 | yes | 27.5 | 0.4 | 46.3 | 2 |
| 5D | Unocal 4151 | 50.0 | 300 | 50 | 45/55 | yes | 27.5 | 0.4 | 43.6 | 2 |
| 5E | Unocal 4305 | 53.0 | 500 | 55 | 45/55 | yes | 29.2 | 0.4 | 42.6 | 2 |
| 5F | Unocal 5550 | 50.0 | 300 | 55 | 45/55 | yes | 27.5 | 0.4 | 42.8 | 2 |
| 5G | Unocal 4176 | 50.0 | 200 | 50 | 50/50 | yes | 27.5 | 0.4 | 46.3 | 2 |
| 5H | Dow DL-283NA | 50.0 | <500 | 59 | — | — | 35.0 | 0.4 | 48.8 | 0 |
| 5I | Rhone-Poulenc WR L0731 | 52.0 | <400 | 55 | 45/55 | — | 26.0 | 1.2 | — | 1 |
| 5J | W.R. Grace Darex 643L | 40.0 | 10 | 63 | 85/15 | no | 21.5 | 1.2 | — | 3 |
| 5K | W.R. Grace Darox 526L | 53.0 | 100 | 45 | 50/50 | yes | 29.2 | 1.2 | — | 1 |
| 5L | Goodyear Pliolite 2108 | 39.5 | 30 | 55–60 | 29/71 | no | 9.9 | 1.2 | 53.8 | 4 |
| 5M | Goodyear Pliolite 2108 | 39.5 | 30 | 55–60 | 29/71 | no | 21.7 | 0.4 | 51.4 | 4 |
| 5N | Goodyear Pliolite 2108 | 39.5 | 30 | 55–60 | 29/71 | no | 21.7 | 1.2 | 52.6 | 5 |
| 5O | Goodyear LPR-6640A | 52.7 | 150 | 57.4 | 57/43 | yes | 29.0 | 1.2 | 51.0 | 0 |
| 5P | Goodyear LVP-5622 | 41.6 | 59 | 53.5 | 15/70/15* | no | 22.9 | 1.2 | 57.8 | 4 |
| 5Q | Goodyear Gelled 2108** | — | — | — | 29/71 | no | 21.7 | 1.2 | 50.5 | 4.5 |
| 5R | LPF-5356 | 69.5 | 1500 | 32.0 | 23/77 | no | 17.4 | 1.2 | — | 3 |
| 5S | Chemigum LCG 260 | *** | — | — | — | — | — | 1.2 | — | 1 |

*Styrene/butadiene/vinyl pyridine
**100 dry parts Pliolite 2108 reacted with 0.25 dry parts t-butylhydroperoxide and 0.25 dry parts sodium erythorbate
***Acrylonitrile butadiene polymer The data indicate that superior erasable marking compositions, e.g., erasability ratings of 4 to 5, are obtainable in accordance with the present invention.

EXAMPLE 6

An erasable marking composition in accordance with the present invention was prepared containing 55.00 wt. % Pliolite ® 2108 SBR emulsion, 3.00 wt. % Hostafine ® blue, red, or green pigment dispersion, 41.85 wt. % water, and 0.15 wt. % Kathon ® PFM preservative.

| Test | Substrate | % Users Giving a Rating of 10 | % Users Giving a Rating of 8 or More | Average Rating |
|---|---|---|---|---|
| Ease of Erasability | Notebook Paper | 41% | 78% | 8.6 |
| Degree of Erasability | Notebook Paper | 30% | 63% | 7.8 |
| Overall Erasability | Four Different | 32% | 64% | 7.7 |

| Test | Substrate | % Users Giving a Rating of 10 | % Users Giving a Rating of 8 or More | Average Rating |
|------|-----------|-------------------------------|--------------------------------------|----------------|
| Paper Types | | | | |

The results indicate that the present invention works well on standard notebook paper as to both the ease and degree of erasability. As regards the experiment using the four different types of paper substrates, while the individual ratings given for each of the four different types of substrates were lower than the total erasability score reported above which was given after the girls were exposed to all the papers, the results of this qualitative testing nonetheless indicate that the erasable marking composition of the present invention is quite satisfactory for ordinary day-to-day use on a variety of paper substrates.

While this invention has been described with emphasis upon a preferred embodiment, it will be obvious to those of ordinary skill in the art that the preferred composition may be varied. It is intended that the invention may be practiced otherwise than as specifically described herein. Accordingly, this invention includes all modifications encompassed within the spirit and scope of the following claims.

What is claimed is:

1. An erasable marking composition, which comprises:
   (a) noncarboxylated styrene-butadiene copolymer resin having a styrene:butadiene ratio of about 29:71,
   (b) a colorant, and
   (c) a solvent, formulated so as to form an erasable marking composition.

2. The erasable marking composition of claim 1, wherein the solvent is water.

3. The erasable marking composition of claim 2, wherein said noncarboxylated styrene-butadiene copolymer resin is an aqueous emulsion having a surface tension of greater than about 50 dynes/cm.

4. The erasable marking composition of claim 3, wherein said aqueous emulsion of noncarboxylated styrene-butadiene copolymer resin has a surface tension of about 55 dynes/cm or higher.

5. The erasable marking composition of claim 2, wherein said colorant is selected from the group consisting of pigments, dyes, and mixtures thereof.

6. The erasable marking composition of claim 5, wherein said colorant is a water-insoluble pigment.

7. The erasable marking composition of claim 6, wherein said pigment has an average particle size greater than about 150 nm.

8. The erasable marking composition of claim 7, wherein said pigment has an average particle size of less than about 150 nm.

9. The erasable marking composition of claim 8, wherein said pigment has an average particle size of about 50 nm to about 150 nm.

10. The erasable marking composition of claim 2, wherein said erasable marking composition has a surface tension of at least about 50 dynes/cm.

11. The erasable marking composition of claim 10, wherein said erasable marking composition has a surface tension of about 50 dynes/cm to about 55 dynes/cm.

12. The erasable marking composition of claim 2, wherein said erasable marking composition has a viscosity of about 1.5 cps to about 6 cps.

13. The erasable marking composition of claim 2, wherein said erasable marking composition has a viscosity of up to about 3000 cps.

14. The erasable marking composition of claim 2, wherein said erasable marking composition further comprises a humectant.

15. The erasable marking composition of claim 14, wherein said humectant is selected from the group consisting of glycerine, glycols, and mixtures thereof.

16. The erasable marking composition of claim 15, wherein said humectant is glycerine.

17. The erasable marking composition of claim 14, wherein said erasable marking composition further comprises a preservative.

18. The erasable marking composition of claim 6, wherein said noncarboxylated styrene-butadiene copolymer resin is present in an amount of about 4% to about 40% by weight of the total erasable marking composition, said water-insoluble pigment is present in an amount of up to about 16% by weight of the total erasable marking composition, and said water is present in an amount of up to about 96% by weight of the total erasable marking composition.

19. The erasable marking composition of claim 18, wherein said erasable marking composition has a surface tension of at least about 50 dynes/cm and a viscosity of about 1.5 cps to about 6 cps.

20. The erasable marking composition of claim 19, wherein said erasable marking composition further comprises a humectant in an amount of up to about 30% by weight of the total erasable marking composition and a preservative in an amount of up to about 0.5% of the total erasable marking composition.

21. The erasable marking composition of claim 17, wherein said noncarboxylated styrene-butadiene copolymer resin is present in an amount of about 16% to about 28% by weight of the total erasable marking composition, said water-insoluble pigment is present in an amount of about 0.4% to about 4% by weight of the total erasable marking composition, said humectant is present in an amount of about 5% to about 20% by weight of the total erasable marking composition, said preservative is present in an amount of up to about 0.15% of the total erasable marking composition, and said water is present in an amount of up to about 78% by weight of the total erasable marking composition.

22. The erasable marking composition of claim 21, wherein said erasable marking composition has a surface tension of at least about 50 dynes/cm.

23. The erasable marking composition of claim 22, wherein said erasable marking composition has a viscosity of about 1.5 cps to about 6 cps.

* * * * *